United States Patent
Swartzentruber et al.

(10) Patent No.: US 8,087,424 B2
(45) Date of Patent: Jan. 3, 2012

(54) SUBSEA VALVE ACTUATOR APPARATUS

(76) Inventors: David D Swartzentruber, Beloit, WI (US); Tushar Kulkarni, Easteigh (GB)

( * ) Notice: Subject to any disclaimer, the term of this patent is extended or adjusted under 35 U.S.C. 154(b) by 827 days.

(21) Appl. No.: 12/157,334

(22) Filed: Jun. 9, 2008

(65) Prior Publication Data

US 2009/0072179 A1    Mar. 19, 2009

Related U.S. Application Data

(60) Provisional application No. 60/934,127, filed on Jun. 11, 2007.

(51) Int. Cl.
*F16K 17/36* (2006.01)

(52) U.S. Cl. ...... 137/81.1; 137/81.2; 251/355; 184/6.12
(58) Field of Classification Search ............ 251/355; 137/81.1, 81.2; 184/6.12
See application file for complete search history.

(56) References Cited

U.S. PATENT DOCUMENTS

| | | | |
|---|---|---|---|
| 4,585,025 A | 4/1986 | Hendrick | |
| 5,233,879 A * | 8/1993 | Watanuki et al. | 74/425 |
| 5,497,672 A * | 3/1996 | Appleford et al. | 74/89.29 |
| 6,276,664 B1 * | 8/2001 | Keller | 251/129.12 |
| 6,305,236 B1 * | 10/2001 | Sturdevant | 74/425 |
| 6,783,107 B2 | 8/2004 | Chatufale | |
| 6,981,428 B2 | 1/2006 | Donald et al. | |
| 7,108,006 B2 | 9/2006 | Armstrong | |
| 7,182,314 B2 | 2/2007 | Harvey et al. | |
| 7,520,291 B2 * | 4/2009 | Watson | 137/81.2 |
| 7,789,370 B2 * | 9/2010 | Eriksson | 251/71 |

* cited by examiner

*Primary Examiner* — John Fristoe, Jr.
*Assistant Examiner* — Marina Tietjen
(74) *Attorney, Agent, or Firm* — David J. Archer

(57) ABSTRACT

A subsea valve actuator apparatus is disclosed for actuating a subsea valve. The valve actuator apparatus includes a housing which defines an enclosure and a rim. A cover cooperates with the rim for sealing the enclosure. A gearbox is disposed within the enclosure the gearbox including a worm wheel which is connected to the subsea valve for actuating the valve. The gearbox includes a seal which is disposed between the worm wheel and the housing for sealing the worm wheel relative to the housing so that lubricant disposed within the enclosure for lubricating the gearbox is sealed within the enclosure. A pressure compensator is disposed within the enclosure for maintaining pressure of the lubricant disposed within the enclosure at substantially the same pressure as the pressure of seawater outside the gearbox.

13 Claims, 5 Drawing Sheets

SUBSEA VALVE ACTUATOR APPARATUS

CROSS REFERENCE TO RELATED APPLICATION

The present application is a Complete application filed pursuant to a Provisional application U.S. Ser. No. 60/934,127 filed Jun. 11, 2007. All of the disclosure of the aforementioned U.S. Ser. No. 60/934,127 is incorporated herein by reference.

BACKGROUND OF THE INVENTION

1. Field of the Invention

The present invention relates to a subsea valve actuator apparatus for actuating a subsea valve.

More specifically, the present invention relates to a subsea valve actuator apparatus for actuating a subsea valve which includes a pressure compensator so that a pressure difference across a seal of the actuator apparatus is minimized.

2. Background Information

Subsea actuators are used under water to actuate valves situated on the seabed and elsewhere. At such depths, the water exerts considerable pressure on the actuator. The actuator includes a housing for the rotatable reception therein of a worm which is rotated from outside the housing. The worm intermeshes with gearing on a worm wheel such that as the worm is rotated several times, the worm wheel is rotated through part of a revolution. The worm wheel is connected to the valve so that rotation of the worm controls the position of the valve which is typically a quarter-turn valve such as a ball valve or butterfly valve, so that the valve is actuated between an opened and a closed disposition thereof.

However, the respective rotational shafts of the worm and worm wheel respectively must be sealed in order to seal and maintain lubricant within the housing. Accordingly, when the actuator is submerged, the seals are subjected to considerable pressure due to the water pressure outside the housing. The present invention provides means for equalizing the pressure of the lubricant within the housing to the water pressure outside the housing so that the seals are able to reliably maintain the lubricant within the housing.

Therefore, the primary feature of the present invention is the provision of a subsea valve actuator apparatus that overcomes the problems associated with the prior art actuators and which makes a significant contribution to the subsea valve actuator apparatus art.

Another feature of the present invention is the provision of a subsea valve actuator apparatus that maintains an equal pressure between lubricant within the housing of the actuator and the water pressure outside the housing so that the seals maintain lubricant within the housing.

A further feature of the present invention is the provision of a subsea valve actuator apparatus that reduces the possibility of leakage of lubricant from the actuator and subsequent contamination of the environment.

Other features and advantages of the present invention will be readily apparent to those skilled in the art by a consideration of the detailed description of a preferred embodiment of the present invention contained herein.

SUMMARY OF THE INVENTION

The present invention relates to a subsea valve actuator apparatus for actuating a subsea valve. The valve actuator apparatus includes a housing which defines an enclosure and a rim. A cover cooperates with the rim for sealing the enclosure. A gearbox is disposed within the enclosure, the gearbox including a worm wheel which is connected to the subsea valve for actuating the valve. The gearbox includes a seal which is disposed between the worm wheel and the housing for sealing the worm wheel relative to the housing so that lubricant disposed within the enclosure for lubricating the gearbox is sealed within the enclosure. A pressure compensator is disposed within the enclosure for maintaining pressure of the lubricant disposed within the enclosure at substantially the same pressure as the pressure of seawater outside the gearbox. The pressure compensator includes a cylindrical wall having a first and a second end, the cylindrical wall defining a chamber. A piston is slidably disposed within the chamber, the piston having a first and a second end so that the piston separates the chamber into a first and a second cavity. The first cavity is disposed adjacent to the first end of the piston and the second cavity is disposed adjacent to the second end of the piston. The first cavity is in fluid communication with the seawater disposed outside the enclosure and the second cavity is in fluid communication with the lubricant disposed within the enclosure. The arrangement is structured such that a pressure differential between the pressure of seawater outside the gearbox and the pressure of the lubricant disposed within the enclosure slides the piston within the chamber so that the pressure differential of the first cavity relative to the second cavity is reduced to zero such that the pressure of the lubricant disposed within the enclosure is maintained at substantially the same pressure as the pressure of the seawater outside the enclosure.

In a more specific embodiment of the present invention, the housing further includes a base defining a periphery. A partition has a first and a second extremity, the partition extending from the base such that the first extremity of the partition is disposed adjacent to the periphery of the base and the second extremity of the partition defines the rim.

The rim defines a groove and a seal is disposed between the groove and the cover for sealing the enclosure.

The gearbox further includes a worm which has a first and a second end. The worm defines a gear which cooperates with the worm wheel such that when the worm is rotated about an axis extending between the ends of the worm, the worm rotates the worm wheel about a further axis of rotation which is disposed substantially normal to the axis of the worm.

A further seal is disposed between the gear and the second end of the worm. The further seal seals the worm relative to the housing so that when the worm is rotated for actuating the valve, a pressure difference across the further seal is minimized.

A bearing is disposed adjacent to the first end of the worm for rotatably supporting the worm relative to the housing and the housing defines a selectively sealable lubricant filling hole.

The worm wheel includes a gear sector which has a first and a second side. A shaft is secured to the gear sector and extends through the gear sector and the housing such that the gear sector is rotatably supported by the housing with the gear sector disposed within the enclosure. The shaft defines a first hub which is disposed adjacent to the first side of the gear sector, the first hub being rotatably supported by the cover.

Additionally, the shaft defines a second hub which is disposed adjacent to the second side of the gear sector, the second hub being rotatably supported by the housing.

Moreover, the seal includes a first and a second seal disposed between the first hub and the cover for sealing the first hub relative to the cover.

A third and a fourth seal are disposed between the second hub and the housing for sealing the second hub relative to the housing.

Also, the pressure compensator further includes a cap which is secured to the first end of the cylindrical wall. The cap and the first end of the cylindrical wall define therebetween a slot for permitting the seawater to enter into the first cavity. A sealing device is disposed between the piston and the cylindrical wall for inhibiting flow of seawater from the first to the second cavity.

Furthermore, the first end of the cylindrical wall defines a radially extending flange. The piston defines a bore which extends from the first to the second end of the piston. A piston plug cooperates with the bore such that when the piston plug is removed, filling of the second cavity with lubricant is permitted. However, when the piston plug is secured within the bore, the differential pressure slides the piston within the chamber.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
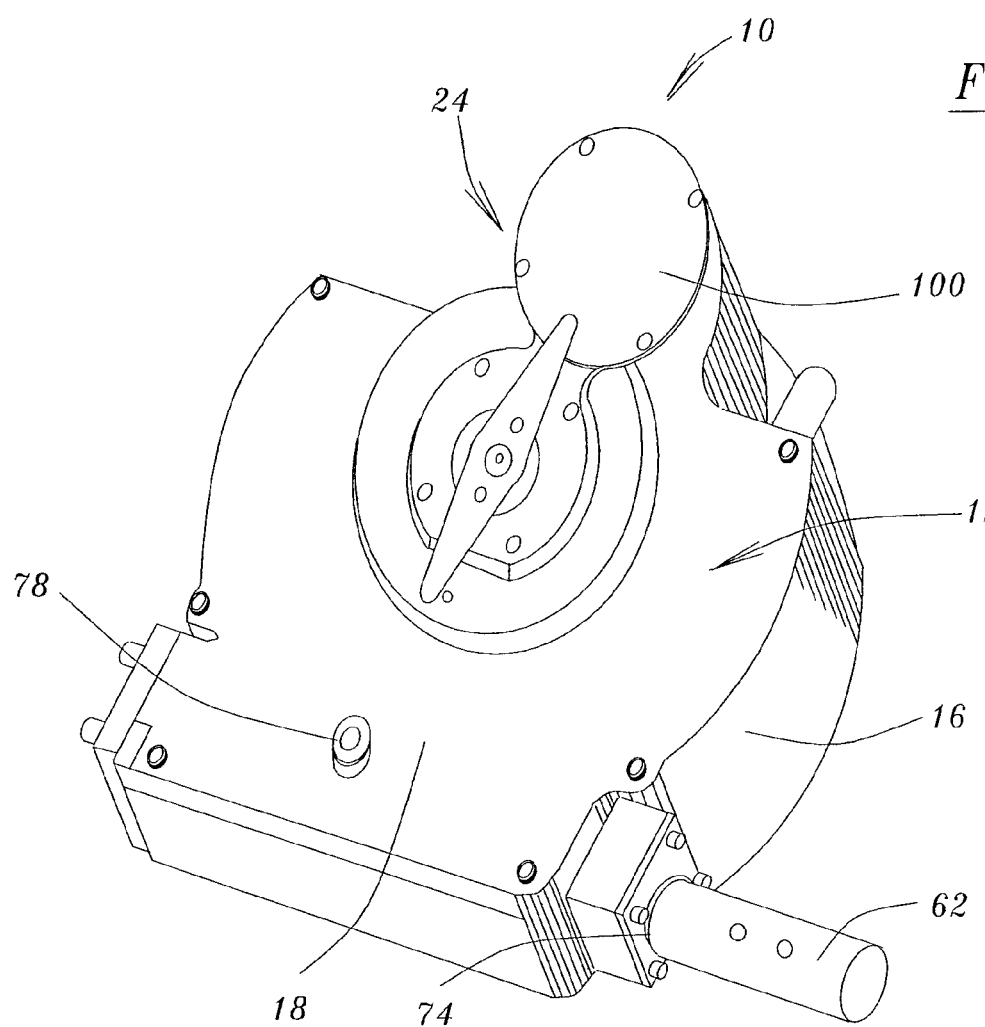
FIG. 1 is a perspective view of a subsea valve actuator apparatus according to the present invention.

FIG. 1 is a perspective view of a subsea valve actuator apparatus generally designated 10 according to the present invention. As shown in FIG. 1, the actuator apparatus 10 is used for actuating a subsea valve (not shown). The valve actuator apparatus 10 includes a housing generally designated 12.

Figure 2:
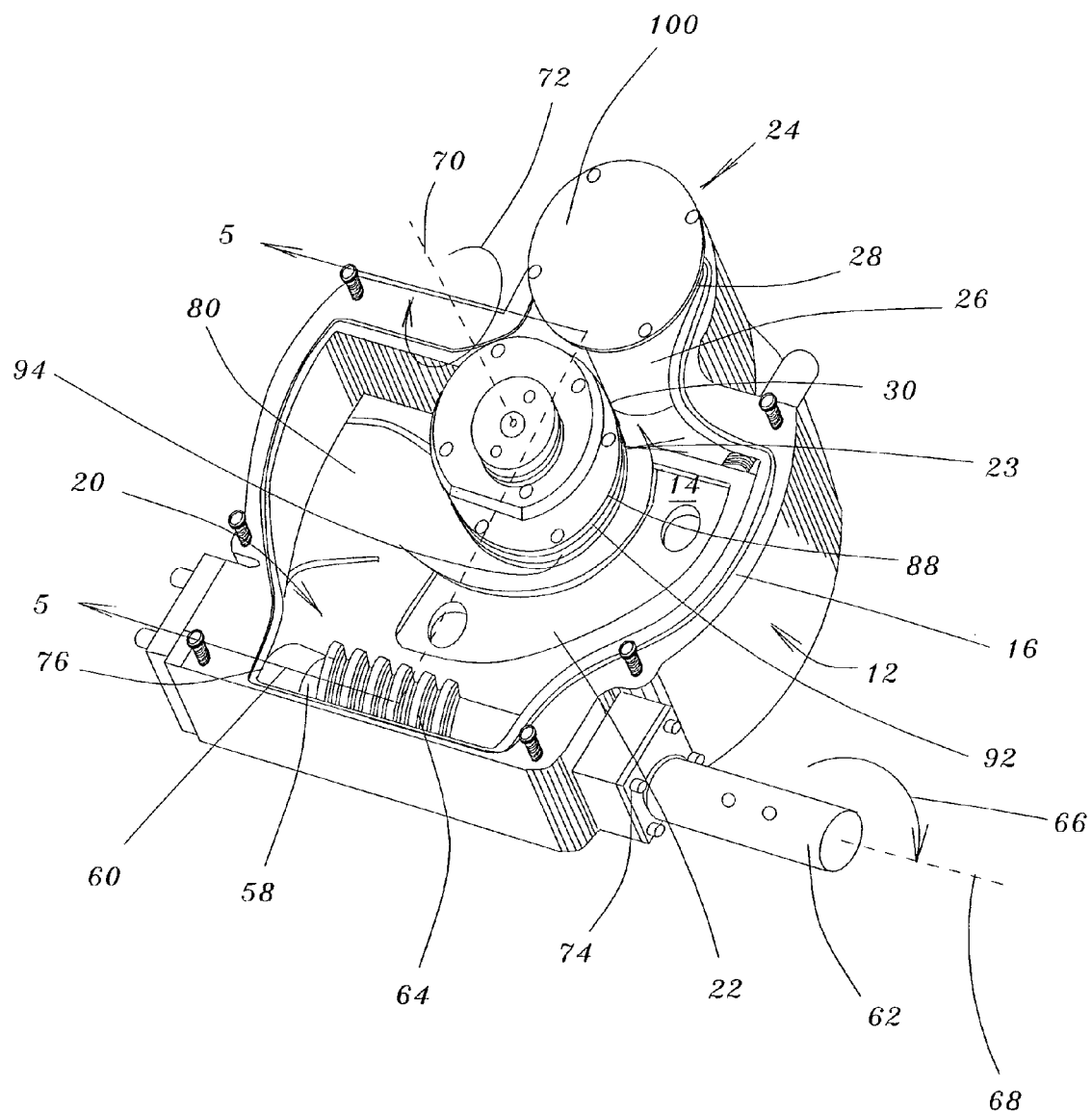
FIG. 2 is a perspective view of the inside of the actuator apparatus shown in FIG. 1.

FIG. 2 is a perspective view of the inside of the actuator apparatus 10 shown in FIG. 1. As shown in FIG. 2, the housing 12 defines an enclosure 14 and a rim 16.

As shown in FIG. 1, a cover 18 cooperates with the rim 16 for sealing the enclosure 14.

Figure 3:
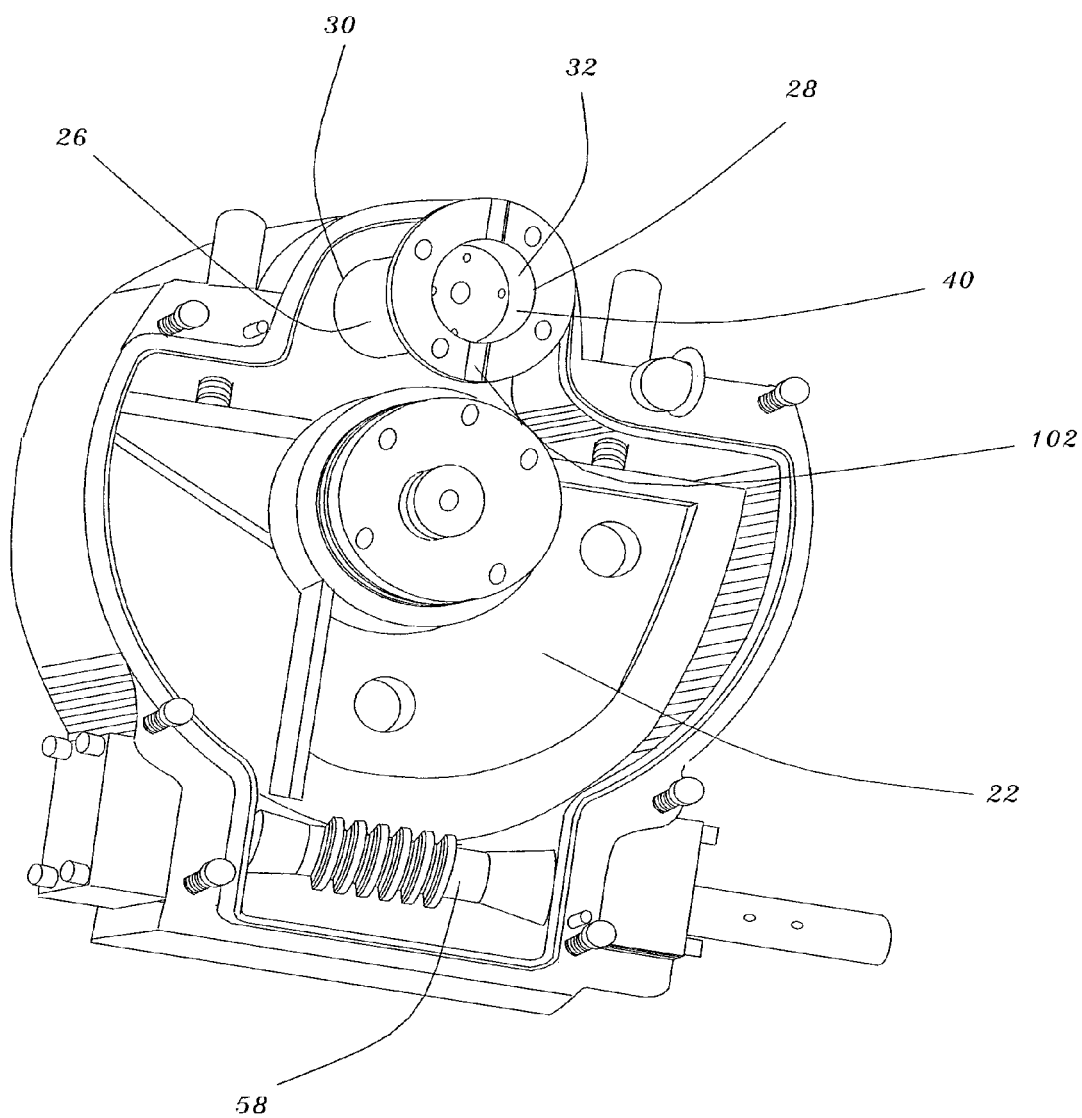
FIG. 3 is a perspective view of the actuator apparatus shown in FIG. 1 but shows the inside of the pressure compensator.

As shown in FIG. 2, a gearbox generally designated 20 is disposed within the enclosure 14, the gearbox 20 including a worm wheel 22 which is connected to the subsea valve (not shown) for actuating the valve. The gearbox 20 includes a seal generally designated 23 which is disposed between the worm wheel 22 and the housing 12 for sealing the worm wheel 22 relative to the housing 12 so that lubricant (not shown) disposed within the enclosure 14 for lubricating the gearbox 20 is sealed within the enclosure 14. A pressure compensator generally designated 24 is disposed within the enclosure 14 for maintaining pressure of the lubricant disposed within the enclosure 14 at substantially the same pressure as the pressure of seawater outside the gearbox 20. The pressure compensator 24 includes a cylindrical wall 26 having a first and a second end 28 and 30 respectively FIG. 3 is a perspective view of the actuator apparatus 10 shown in FIG. 1 but shows the inside of the pressure compensator 24. As shown in FIG. 3, the cylindrical wall 26 defines a chamber 32. A piston 34 is slidably disposed within the chamber 32.

Figure 4:
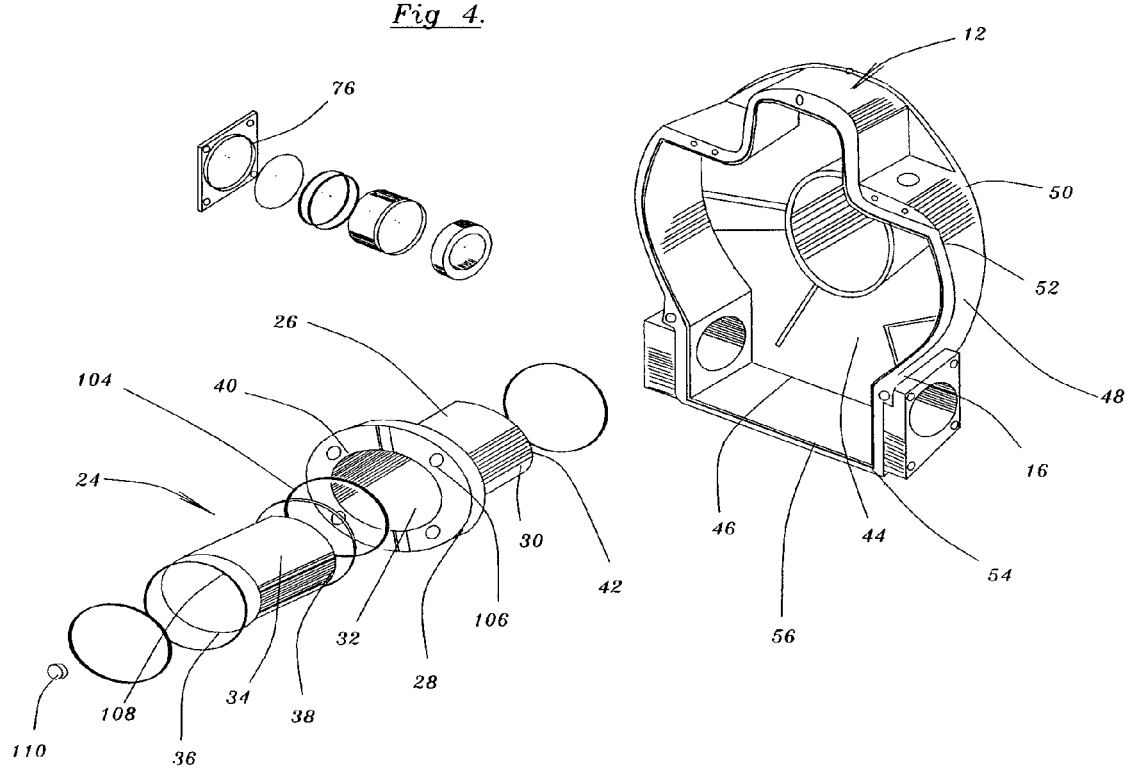
FIG. 4 is an exploded perspective view of the actuator apparatus shown in FIG. 1.

FIG. 4 is an exploded perspective view of the actuator apparatus shown in FIG. 1. As shown in FIG. 4, the piston 34 has a first and a second end 36 and 38 respectively so that the piston 34 separates the chamber 32 into a first and a second cavity 40 and 42 respectively. The first cavity 40 is disposed adjacent to the first end 36 of the piston 34 and the second cavity 42 is disposed adjacent to the second end 38 of the piston 34. The first cavity 40 is in fluid communication with the seawater disposed outside the enclosure 14 and the second cavity 42 is in fluid communication with the lubricant disposed within the enclosure 14. The arrangement is structured such that a pressure differential between the pressure of seawater outside the gearbox 20 and the pressure of the lubricant disposed within the enclosure 14 slides the piston 34 within the chamber 32 so that the pressure differential between the first cavity 40 relative to the second cavity 42 is reduced to zero such that the pressure of the lubricant disposed within the enclosure 14 is maintained at substantially the same pressure as the pressure of seawater outside the gearbox 20 so that a pressure difference across the seal 23 is minimized.

As shown in FIG. 4, the housing 12 further includes a base 44 which defines a periphery 46. A partition 48 has a first and a second extremity 50 and 52 respectively. The partition 48 extends from the base 44 such that the first extremity 50 of the partition 48 is disposed adjacent to the periphery 46 of the base 44 and the second extremity 52 of the partition 48 defines the rim 16.

The rim 16 defines a groove 54 and a seal 56 is disposed between the groove 54 defined by the rim 16 and the cover 18 for sealing the enclosure 14.

As shown in FIG. 2, the gearbox 20 further includes a worm 58 which has a first and a second end 60 and 62 respectively. The worm 58 defines a gear 64 which cooperates with the worm wheel 22. The arrangement is such that when the worm 58 is rotated as indicated by the arrow 66 about an axis 68 extending between the ends 60 and 62 of the worm 58, the worm 58 rotates the worm wheel 22 about a further axis of rotation 70 as indicated by the arrow 72. The further axis of rotation 70 is disposed substantially normal to the axis 68 of the worm 58.

A further seal 74 is disposed between the gear 64 and the second end 62 of the worm 58. The further seal 74 seals the worm 58 relative to the housing 12 so that when the worm 58 is rotated as indicated by the arrow 66 for actuating the valve, a pressure difference across the further seal 74 between the lubricant inside the housing 12 and the seawater outside the housing 12, is minimized.

As shown in FIGS. 2 and 4, bearing 76 is disposed adjacent to the first end 60 of the worm 58 for rotatably supporting the worm 58 relative to the housing 12.

As shown in FIG. 1, the cover 18 defines a selectively sealable lubricant filling hole 78.

As shown in FIG. 2, the worm wheel 22 includes a gear sector 80.

Figure 5:
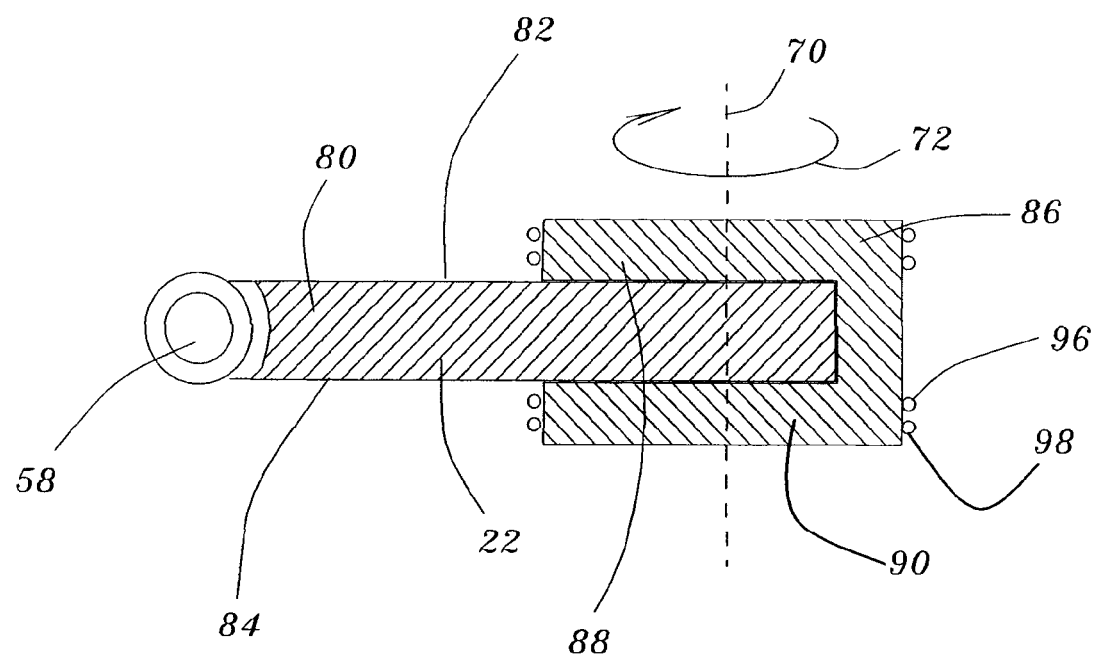
FIG. 5 is a sectional view taken on the line 5-5 of FIG. 2.

FIG. 5 is a sectional view taken on the line 5-5 of FIG. 2. As shown in FIG. 5, the gear sector 80 has a first and a second side 82 and 84 respectively. A shaft 86 is secured to the gear sector 80 and extends through the gear sector 80 and the housing 12 such that the gear sector 80 is rotatably supported by the housing 12 with the gear sector 80 disposed within the enclosure 14 as shown in FIG. 2. The shaft 86 defines a first hub 88 which is disposed adjacent to the first side 82 of the gear sector 80, the first hub 88 being rotatably supported by the cover 18.

Additionally, as shown in FIG. 5, the shaft 86 defines a second hub 90 which is disposed adjacent to the second side 84 of the gear sector 80, the second hub 90 being rotatably supported by the housing 12.

Moreover, the seal 23 shown in FIG. 2, includes a first and a second seal 92 and 94 respectively which are disposed between the first hub and the cover 18 for sealing the first hub 88 relative to the cover 18.

As shown in FIG. 5, a third and a fourth seal 96 and 98 respectively are disposed between the second hub 90 and the housing 12 for sealing the second hub 90 relative to the housing 12.

As shown in FIG. 2, the pressure compensator 24 further includes a cap 100 which is secured to the first end 28 of the cylindrical wall 26.

As shown in FIG. 3, the cap 100 and the first end 28 of the cylindrical wall 26 define therebetween a slot 102 for permitting the seawater to enter into the first cavity 40.

As shown in FIG. 4, a sealing device such as a seal 104 is disposed between the piston 34 and the internal surface of the cylindrical wall 26 for inhibiting the flow of seawater from the first cavity 40 to the second cavity 42.

Furthermore, the first end 28 of the cylindrical wall 26 defines a radially extending flange 106. The piston 34 defines a bore 108 which extends from the first end 36 to the second end 38 of the piston 34. A piston plug 110 cooperates with the bore 108 such that when the piston plug 110 is removed, filling of the second cavity 42 with lubricant is permitted. However, when the piston plug 110 is secured within the bore 108, the differential pressure slides the piston 34 within the chamber 32.

The general configuration of the worm and worm wheel and the connection of the shaft of the worm wheel to the valve are similar in several respects to the arrangement of the valve actuator disclosed in Applicant's U.S. Pat. No. 7,182,314 which issued Feb. 27, 2007. All of the disclosure of the aforementioned U.S. Pat. No. 7,182,314 is incorporated herein by reference.

In operation of the apparatus 10, the cover 18 is secured to the rim 16 and the enclosure 14 is filled with lubricant via filling hole 78. The actuator shaft 86 is connected to the valve so that rotation of the worm 58 as indicated by the arrow 66 causes rotation of the shaft 86 as indicated by the arrow 72 for operating the valve. The high pressure seawater outside the housing is in fluid communication with the first cavity 40 of the chamber 32 so that such subsea pressure urges the piston 34 axially along the chamber 32 so that lubricant disposed within the second cavity 42 is pressurized to the same pressure as the subsea pressure. Accordingly, because the lubricant fills the entire enclosure, all the seals including seals 92, 94, 96, 98 and further seal 74 have an equal pressure exerted upon them from within the enclosure and outside the enclosure thus minimizing any possibility of lubricant escaping from the housing past the seals thereby reducing the possibility of environmental pollution.

The present invention provides a unique arrangement for equalizing the pressure across seals of a subsea valve actuator apparatus.

What is claimed is:

1. A subsea valve actuator apparatus for actuating a subsea valve, said valve actuator comprising:
   a housing defining an enclosure and a rim;
   said housing including:
   a cover cooperating with said rim for sealing said enclosure;
   a gearbox disposed within said enclosure;
   said gearbox including:
   a worm wheel connected to the subsea valve for actuating the valve;
   a seal disposed between said worm wheel and said housing for sealing said worm wheel relative to said housing so that lubricant disposed within said enclosure for lubricating said gearbox is sealed within said enclosure;
   a pressure compensator disposed within said enclosure for maintaining pressure of the lubricant disposed within said enclosure at substantially the same pressure as the pressure of seawater outside the gearbox;
   said pressure compensator including;
   a cylindrical wall having a first and a second end, said wall defining a chamber;
   a piston slidably disposed within said chamber, said piston having a first and a second end so that said piston separates said chamber into a first and a second cavity, said first cavity being disposed adjacent to said first end of said piston, said second cavity being disposed adjacent to said second end of said piston;
   said first cavity being in fluid communication with the seawater disposed outside the enclosure; and
   said second cavity being in fluid communication with the lubricant disposed within said enclosure so that a pressure differential between the pressure of seawater outside the enclosure and the pressure of the lubricant disposed within said enclosure slides said piston within said chamber such that said pressure differential of said first cavity relative to said second cavity is reduced to zero so that the pressure of the lubricant disposed within said enclosure is maintained at substantially the same pressure as the pressure of seawater outside said enclosure such that a pressure difference across said seal is minimized.

2. A subsea valve actuator apparatus as set forth in claim 1 wherein said housing further includes:
   a base defining a periphery;
   a partition having a first and a second extremity, said partition extending from said base such that said first extremity of said partition is disposed adjacent to said periphery of said base and said second extremity of said partition defines said rim.

3. A subsea valve actuator apparatus as set forth in claim 1 wherein
   said rim defines a groove;
   a seal disposed between said groove defined by said rim and said cover for sealing said enclosure.

4. A subsea valve actuator apparatus as set forth in claim 1 wherein said gearbox further includes:
   a worm having a first and a second end, said worm defining a gear which cooperates with said worm wheel such that when said worm is rotated about an axis extending between said ends of said worm, said worm rotates said worm wheel about a further axis of rotation disposed substantially normal to said axis of said worm.

5. A subsea valve actuator apparatus as set forth in claim 4 wherein said gearbox further includes:
   a further seal disposed between said gear and said second end of said worm, said further seal sealing said worm relative to said housing so that when said worm is rotated for actuating the valve, a pressure difference across said further seal is minimized.

6. A subsea valve actuator apparatus as set forth in claim 1 wherein said gearbox further includes:
a bearing disposed adjacent to a first end of said worm for rotatably supporting said worm relative to said housing.

7. A subsea valve actuator apparatus as set forth in claim 1 wherein said housing defines a selectively sealable lubricant filling hole.

8. A subsea valve actuator apparatus as set forth in claim 1 wherein said worm wheel includes:
a gear sector having a first and a second side;
a shaft secured to said gear sector and extending through said gear sector and said housing such that said gear sector is rotatably supported by said housing with said gear sector disposed within said enclosure;
said shaft defining a first hub disposed adjacent to said first side of said gear sector, said first hub being rotatably supported by said cover;
said shaft defining a second hub disposed adjacent to said second side of said gear sector, said second hub being rotatably supported by said housing;
said seal includes:
a first and a second seal disposed between said first hub and said cover for sealing said first hub relative to said cover;
a third and a fourth seal disposed between said second hub and said housing for sealing said second hub relative to said housing.

9. A subsea valve actuator apparatus as set forth in claim 1 wherein
said pressure compensator further includes;
a cap secured to said first end of said cylindrical wall;
said cap and said first end of said cylindrical wall defining therebetween a slot for permitting the seawater to enter into said first cavity;
a sealing device disposed between said piston and said cylindrical wall for inhibiting flow of seawater from said first to said second cavity.

10. A subsea valve actuator apparatus as set forth in claim 1 wherein said first end of said cylindrical wall defines a radially extending flange.

11. A subsea valve actuator apparatus as set forth in claim 1 wherein said piston defines a bore extending from said first to said second end of said piston;
a piston plug cooperating with said bore such that when said piston plug is removed filling of said second cavity with lubricant is permitted and when said piston plug is secured within said bore said differential pressure slides said piston within said chamber.

12. A subsea valve actuator apparatus for actuating a subsea valve, said valve actuator comprising:
a housing defining an enclosure and a rim;
said housing including:
a cover cooperating with said rim for sealing said enclosure;
a gearbox disposed within said enclosure;
said gearbox including:
a worm wheel connected to the subsea valve for actuating the valve;
a seal disposed between said worm wheel and said housing for sealing said worm wheel relative to said housing so that lubricant disposed within said enclosure for lubricating said gearbox is sealed within said enclosure;
a pressure compensator disposed within said enclosure for maintaining pressure of the lubricant disposed within said enclosure at substantially the same pressure as the pressure of seawater outside the gearbox;
said pressure compensator including;
a cylindrical wall having a first and a second end, said wall defining a chamber;
a piston slidably disposed within said chamber, said piston having a first and a second end so that said piston separates said chamber into a first and a second cavity, said first cavity being disposed adjacent to said first end of said piston, said second cavity being disposed adjacent to said second end of said piston;
said first cavity being in fluid communication with the seawater disposed outside the enclosure;
said second cavity being in fluid communication with the lubricant disposed within said enclosure so that a pressure differential between the pressure of seawater outside the gearbox and the pressure of the lubricant disposed within said enclosure slides said piston within said chamber such that said pressure differential of said first cavity relative to said second cavity is reduced to zero so that the pressure of the lubricant disposed within said enclosure is maintained at substantially the same pressure as the pressure of seawater outside the gearbox such that a pressure difference across said seal is minimized;
said worm wheel including:
a gear sector having a first and a second side;
a shaft secured to said gear sector and extending through said gear sector and said housing such that said gear sector is rotatably supported by said housing with said gear sector disposed within said enclosure;
said shaft defining a first hub disposed adjacent to said first side of said gear sector said first hub being rotatably supported by said cover;
said shaft defining a second hub disposed adjacent to said second side of said gear sector said second hub being rotatably supported by said housing;
said seal including:
a first and a second seal disposed between said first hub and said cover for sealing said first hub relative to said cover; and
a third and a fourth seal disposed between said second hub and said housing for sealing said second hub relative to said housing.

13. A subsea valve actuator apparatus for actuating a subsea valve, said valve actuator comprising:
a housing defining an enclosure and a rim;
said housing including:
a cover cooperating with said rim for sealing said enclosure;
a gearbox disposed within said enclosure;
said gearbox including:
a worm wheel connected to the subsea valve for actuating the valve;
a seal disposed between said worm wheel and said housing for sealing said worm wheel relative to said housing so that lubricant disposed within said enclosure for lubricating said gearbox is sealed within said enclosure;
a pressure compensator disposed within said enclosure for maintaining pressure of the lubricant disposed within said enclosure at substantially the same pressure as the pressure of seawater outside the gearbox;
said pressure compensator including;
a cylindrical wall having a first and a second end, said wall defining a chamber;
a piston slidably disposed within said chamber, said piston having a first and a second end so that said piston separates said chamber into a first and a second cavity, said first cavity being disposed adjacent to said first end of said piston, said second cavity being disposed adjacent to second end of said piston;

said first cavity being in fluid communication with the seawater disposed outside the enclosure;

said second cavity being in fluid communication with the lubricant disposed within said enclosure so that a pressure differential between the pressure of seawater outside the gearbox and the pressure of the lubricant disposed within said enclosure slides said piston within said chamber such that said pressure differential of said first cavity relative to said second cavity is reduced to zero so that the pressure of the lubricant disposed within said enclosure is maintained at substantially the same pressure as the pressure of seawater outside the gearbox such that a pressure difference across said seal is minimized;

said housing further including:

a base defining a periphery;

a partition having a first and a second extremity, said partition extending from said base such that said first extremity of said partition is disposed adjacent to said periphery of said base and second extremity of said partition defines said rim;

said rim defining a groove;

a seal disposed between said groove defined by said rim and said cover for sealing said enclosure;

said gearbox further including:

a worm having a first and a second end, said worm defining a gear which cooperates with said worm wheel such that when said worm is rotated about an axis extending between said ends of said worm, said worm rotates said worm wheel about a further axis of rotation disposed substantially normal to said axis of said worm;

a further seal disposed between said gear and said second end of said worm, said further seal sealing said worm relative to said housing so that when said worm is rotated for actuating the valve, a pressure difference across said further seal is minimized;

a bearing disposed adjacent to said first end of said worm for rotatably supporting said worm relative to said housing;

said housing defining a selectively sealable lubricant filling hole;

said worm wheel including:

a gear sector having a first and a second side;

a shaft secured to said gear sector and extending through said gear sector and said housing such that said gear sector is rotatably supported by said housing with said gear sector disposed within said enclosure;

said shaft defining a first hub disposed adjacent to said first side of said gear sector said first hub being rotatably supported by said cover;

said shaft defining a second hub disposed adjacent to said second side of said gear sector said second hub being rotatably supported by said housing;

said seal includes:

a first and a second seal disposed between said first hub and said cover for sealing said first hub relative to said cover;

a third and a fourth seal disposed between said second hub and said housing for sealing said second hub relative to said housing;

said pressure compensator further including;

a cap secured to said first end of said cylindrical wall;

said cap and said first end of said cylindrical wall defining therebetween a slot for permitting the seawater to enter into said first cavity;

a sealing device disposed between said piston and said cylindrical wall for inhibiting flow of seawater from said first to said second cavity;

said first end of said cylindrical wall defining a radially extending flange; and said piston defining a bore extending from said first to said second end of said piston;

a piston plug cooperating with said bore such that when said piston plug is removed filling of said second cavity with lubricant is permitted and when said piston plug is secured within said bore said differential pressure slides said piston within said chamber.

* * * * *